(12) United States Patent
Jang et al.

(10) Patent No.: US 7,071,258 B1
(45) Date of Patent: Jul. 4, 2006

(54) NANO-SCALED GRAPHENE PLATES

(75) Inventors: Bor Z. Jang, Fargo, ND (US); Wen C. Huang, Fargo, ND (US)

(73) Assignee: Nanotek Instruments, Inc., Dayton, OH (US)

( * ) Notice: Subject to any disclaimer, the term of this patent is extended or adjusted under 35 U.S.C. 154(b) by 442 days.

(21) Appl. No.: 10/274,473

(22) Filed: Oct. 21, 2002

(51) Int. Cl.
*C01B 31/04* (2006.01)
*C08K 3/04* (2006.01)
*C22C 101/10* (2006.01)
*C04B 35/52* (2006.01)

(52) U.S. Cl. ............... 524/496; 423/448; 423/445 B; 423/460; 423/447.2; 977/755; 977/773; 977/778; 977/783; 501/99; 75/243

(58) Field of Classification Search ............... 423/447, 423/460, 445, 448, 447.2, 445 B; 502/417, 502/416, 406; 118/723; 429/231, 217; 241/199.5; 977/755, 773, 778; 524/496; 501/99; 75/243
See application file for complete search history.

(56) References Cited

U.S. PATENT DOCUMENTS

| | | | |
|---|---|---|---|
| 5,186,919 A * | 2/1993 | Bunnell .................. 423/448 |
| 6,479,030 B1 * | 11/2002 | Firsich .................. 423/447.1 |
| 6,863,943 B1 * | 3/2005 | Wang et al. .................. 428/37 |
| 6,872,330 B1 * | 3/2005 | Mack et al. ............ 252/378 R |
| 2003/0129305 A1 * | 7/2003 | Wu et al. ............... 427/255.28 |
| 2003/0224168 A1 * | 12/2003 | Mack et al. ................ 428/408 |
| 2004/0127621 A1 * | 7/2004 | Drzal et al. .................. 524/424 |

OTHER PUBLICATIONS

Nichiko Kusuniko, "Epitaxial Carbon Film Self-organized by Sublimation Decomposition of Silicon Carbide", Appl. Phys. Lett. vol. 71, pp. 2620, 1997.
W. Z. Li et al. "Large-Scale Synthesis of Aligned Carbon Nanotubes" Science, vol. 274, Dec. 6, 1996, pp. 1701-1703.

* cited by examiner

*Primary Examiner*—Stuart L. Hendrickson
*Assistant Examiner*—Alvin T Raetzsch

(57) ABSTRACT

A nano-scaled graphene plate material and a process for producing this material. The material comprises a sheet of graphite plane or a multiplicity of sheets of graphite plane. The graphite plane is composed of a two-dimensional hexagonal lattice of carbon atoms and the plate has a length and a width parallel to the graphite plane and a thickness orthogonal to the graphite plane with at least one of the length, width, and thickness values being 100 nanometers or smaller. The process for producing nano-scaled graphene plate material comprises the steps of: a). partially or fully carbonizing a precursor polymer or heat-treating petroleum or coal tar pitch to produce a polymeric carbon containing micron- and/or nanometer-scaled graphite crystallites with each crystallite comprising one sheet or a multiplicity of sheets of graphite plane; b). exfoliating the graphite crystallites in the polymeric carbon; and c). subjecting the polymeric carbon containing exfoliated graphite crystallites to a mechanical attrition treatment to produce the nano-scaled graphene plate material.

5 Claims, 1 Drawing Sheet

NANO-SCALED GRAPHENE PLATES

FIELD OF THE INVENTION

The present invention relates to a nano-scaled thin-plate carbon material, hereinafter referred to as nano-scaled graphene plate (NGP), and a process for producing the NGP material.

BACKGROUND

Carbon is known to have four unique crystalline structures, including diamond, graphite, fullerene and carbon nano-tubes. The carbon nano-tube refers to a tubular structure grown with a single wall or multi-wall, which can be conceptually obtained by rolling up a graphite sheet (a sheet of graphene plane or basal plane) or several graphite sheets to form a concentric hollow structure. A graphene plane is characterized by having a network of carbon atoms occupying a two-dimensional hexagonal lattice. Carbon nano-tubes have a diameter on the order of a few nanometers to a few hundred nanometers.

Carbon nano-tubes can function as either a conductor or a semiconductor, depending on the rolled shape and the diameter of the helical tubes. Its longitudinal, hollow structure imparts unique mechanical, electrical, thermal and chemical properties to the material. Carbon nano-tubes are believed to have great potential for use in field emission devices, hydrogen fuel storage, rechargeable battery electrodes, coating ingredients, solid lubricant, fillers for a resin, and composite reinforcements.

Iijima was the first to report the production of carbon nanotubes by an arc discharge between two graphite rods. This technique still remains to be the most commonly used technique for producing carbon nanotubes; however, yield of pure carbon nanotubes with respect to the end product is only about 15%. Thus, a complicated, slow and expensive purification process must be carried out for particular device applications.

Kusunoki described another conventional approach to produce carbon nanotubes, which was published in an article entitled "Epitaxial Carbon Nanotube Film Self-organized by Sublimation Decomposition of Silicon Carbide" (Appl. Phys. Lett. Vol. 71, pp. 2620, 1977). Carbon nanotubes were produced at high temperatures by irradiating a laser onto graphite or silicon carbide. In this case, the carbon nanotubes are produced from graphite at about 1,200° C. or more and from silicon carbide at about 1,600 to 1,700° C. However, this method also requires multiple stages of purification which increases the cost. In addition, this method has difficulties in large-device applications.

Li, et al. Reported a method of producing carbon nanotubes through a thermal decomposition of hydrocarbon series gases by chemical vapor deposition (CVD) ("Large-Scale Synthesis of Aligned Carbon Nanotubes," Science, Vol. 274, Dec. 6, 1996, pp. 1701–1703). This technique is applicable only with a gas that is unstable, such as acetylene or benzene. For example, a methane ($CH_4$) gas cannot be used to produce carbon nanotubes by this technique.

A carbon nanotube layer may be grown on a substrate using a plasma chemical vapor deposition method at a high density of $10^{11}$ $cm^{-3}$ or more. The substrate may be an amorphous silicon or polysilicon substrate on which a catalytic metal layer is formed. In the growth of the carbon nanotube layer, a hydrocarbon series gas may be used as a plasma source gas, the temperature of the substrate may be in the range of 600 to 900° C., and the pressure may be in the range of 10 to 1000 mTorr.

In summary, carbon nano-tubes are extremely expensive due to the low yield and low production and purification rates commonly associated with all of the current carbon nano-tube preparation processes. The high material costs have significantly hindered the widespread application of nano-tubes. A large number of researchers are making attempts to develop much lower-cost processes for nano-tubes. We have taken a different approach in that, instead of carbon nano-tubes, we chose to develop alternative nano-scaled carbon materials that exhibit comparable properties, but are more readily available and at much lower costs.

It is envisioned that individual nano-scaled graphite planes (individual sheets of graphene plane) and clusters of multiple nano-scaled graphene sheets, collectively called "nano-sized graphene plates (NGPs)," could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate (FIG. 1). Studies on the structure-property relationship in isolated NGPs could provide insight into the properties of a fullerene structure or carbon nano-tube. Furthermore, these nano materials could potentially become cost-effective substitutes for carbon nano-tubes or other types of nano-rods for various scientific and engineering applications.

Direct synthesis of the NGP material had not been possible, although the material had been conceptually conceived and theoretically predicted to be capable of exhibiting many novel and useful properties. The present invention provides a process for producing large quantities of NGPs. The process is estimated to be highly cost-effective.

SUMMARY OF THE INVENTION

As a preferred embodiment of the presently invented process, NGPs can be readily produced by the following procedures: (1) partially or fully carbonizing a variety of precursor polymers, such as polyacrylonitrile (PAN) fibers and phenol-formaldehyde resin, or heat-treating petroleum or coal tar pitch, (2) exfoliating the resulting carbon- or graphite-like structure, and (3) mechanical attrition (e.g., ball milling) of the exfoliated structure to become nano-scaled. The heat treatment temperature and time and the mechanical attrition conditions can be varied to generate, by design, various NGP materials with a wide range of graphene plate thickness, width and length values. The heat treatment temperature typically lies in the range of 300–1,000° C. for partial carbonization and 1,000–3,000° C. for more complete carbonization and graphitization. The processing ease and the wide property ranges that can be achieved with NGP materials make them promising candidates for many important engineering applications. The electronic, thermal and mechanical properties of NGP materials are expected to be comparable to those of carbon nano-tubes; but NGPs will be available at much lower costs and in larger quantities.

DETAILED DESCRIPTION OF PREFERRED EMBODIMENTS

Figure 1:
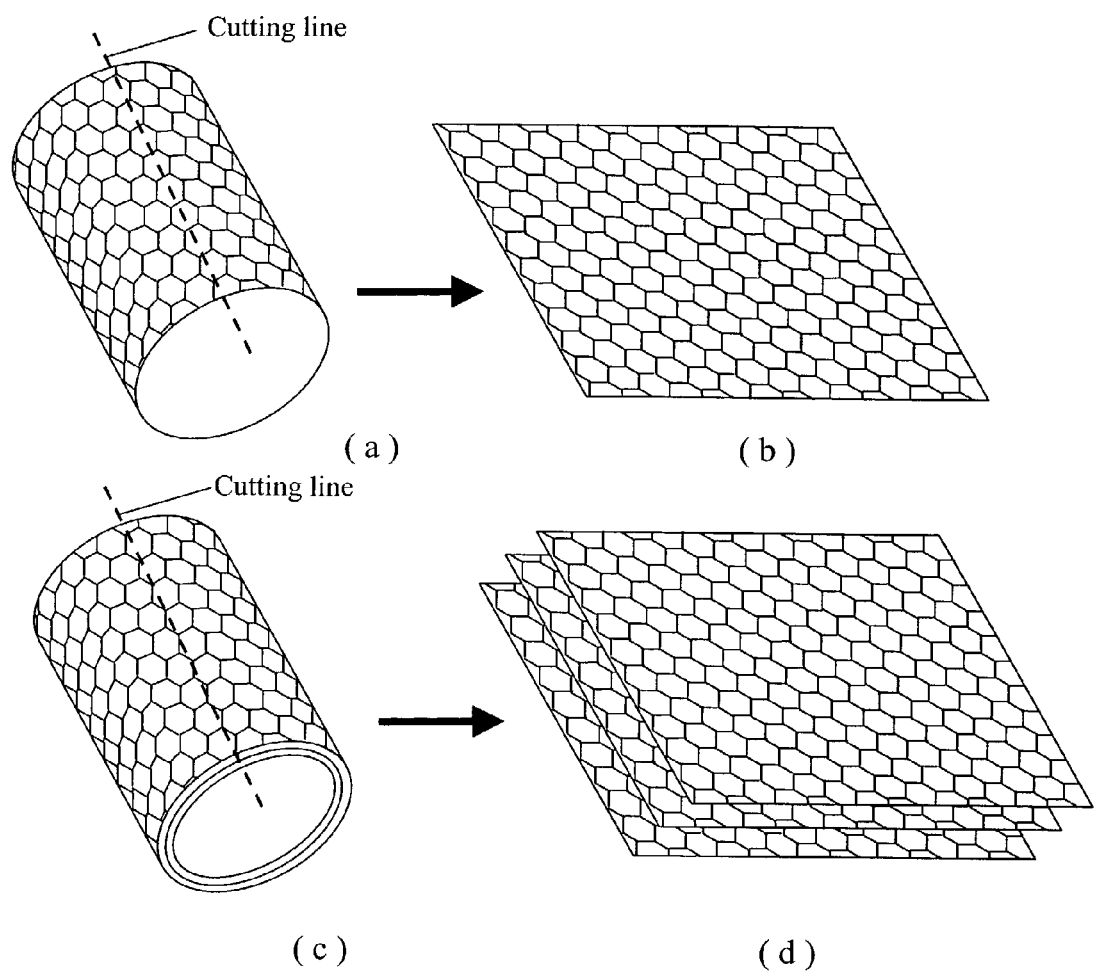
FIG. 1 conceptually illustrates the configuration difference between a carbon nano-tube and a nano-scaled graphene plate.

One preferred embodiment of the present invention is a nano-scaled graphene plate (NGP) material that is essentially composed of a sheet of graphite plane or a plurality of sheets of graphite plane. Each graphite plane, also referred to as a graphene plane or basal plane, comprises a two-dimensional hexagonal structure of carbon atoms. Each plate has a length and a width parallel to the graphite plane and a thickness orthogonal to the graphite plane characterized in that at least one of the values of length, width, and thickness is 100 nanometers (nm) or smaller. Preferably, all length, width and thickness values are smaller than 100 nm. This NGP material can be produced by a process comprising the steps of: (a) carbonization or graphitization to produce a polymeric carbon, (b) exfoliation or expansion of graphite crystallites in the polymeric carbon to delaminate or separate graphene planes, and (c) mechanical attrition of the exfoliated structure to nanometer-scaled plates.

The first step involves partially carbonizing, fully carbonizing, or graphitizing a precursor material such as a polymer, or a petroleum or coal tar pitch material to produce a polymeric carbon. The resulting polymeric carbon presumably contains micron- and/or nanometer-scaled graphite crystallites with each crystallite being composed of one sheet or several of sheets of graphite plane. Preferably, the polymeric carbon is pulverized, chopped, or milled to become small particles or short fiber segments, with a dimension preferably smaller than 1 mm and, further preferably smaller than 0.05 mm before the second step is carried out.

The second step involves exfoliating the graphite crystallites in the polymeric carbon. Exfoliation typically involves a chemical treatment, intercalation, foaming, heating and/or cooling steps. The purpose of the exfoliation treatment is to delaminate (at least crack open between) the graphene planes or to partially or fully separate graphene planes in a graphite crystallite.

The third step includes subjecting the polymeric carbon containing exfoliated graphite crystallites to a mechanical attrition treatment to produce a nano-scaled graphene plate material. Either the individual graphene planes (one-layer NGPs) or stacks of graphene planes bonded together (multi-layer NGPs) are reduced to nanometer-sized (preferably both length and width being smaller than 100 nm in size, further preferably smaller than 10 nm in size). In the thickness direction (or c-axis direction normal to the graphene plane), there may be a small number of graphene planes that are still bonded together through the van der Waal's forces that commonly hold the basal planes together in a natural graphite. Preferably, there are less than 20 layers (further preferably less than 5 layers) of graphene planes, each with length and width smaller than 100 nm, that constitute a multi-layer NGP material produced after mechanical attrition. Preferred embodiments of the present invention are further described as follows:

Carbonization Treatment: The preparation of organic semiconducting materials by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, a highly organized crystal (graphite), or a wide range of intermediate structures that are characterized in that various proportions and sizes of graphite crystallites and defects are dispersed in an amorphous matrix. Thus far, all of the earlier experimental studies on polymeric carbons have been based on bulk samples that contain a blend of graphite crystalline structures (crystallites) of various sizes, amorphous phases, and high defect populations and, hence, the properties measured represent the global properties of all the constituent phases together. No experimental work has been reported on the properties of individual, isolated carbon crystallites or graphene plates that are nanometer-sized presumably due to the lack of a method to directly synthesize such nano materials.

Polyacene $(C_4H_2)_n$ and two-dimensional condensed aromatic rings or hexagons (nano-scaled graphene sheets) can be found inside the microstructure of a heat treated polymer such as a PAN fiber. An appreciable amount of polyacene derivatives and smaller-sized graphene sheets are believed to exist in PAN-based polymeric carbons treated at 300–1,000° C. These species condense into wider aromatic ring structures (larger-sized graphene sheets) and thicker plates (more graphene sheets stacked together) with a higher HTT or longer heat treatment time. These graphene plates are gradually transformed into a well-developed "turbostratic structure" characteristic of the microstructure of a carbon fiber.

NGP materials from several classes of precursor materials were prepared. For instance, the first class includes semi-crystalline PAN in a fiber form. As compared to phenolic resin, the pyrolyzed PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene sheets), and chemical composition of the resulting NGP materials.

PAN fibers were subjected to oxidation at 200–350° C. while under a tension, and then partial or complete carbonization at 350–1,500° C. to obtain polymeric carbons with various nano-crystalline graphite structures (graphite crystallites). Selected samples of these polymeric carbons were further heat-treated at a temperature in the range of 1,500–3,000° C. to partially or fully graphitize the materials. Phenol formaldehyde resin and petroleum and coal tar pitch materials were subjected to a similar heat treatments in a temperature range of 500 to 2,500° C.

Exfoliation Treatment: In general, for the purpose of exfoliating graphene plane layers, the chemical treatment of pyrolyzed polymer or pitch materials involved subjecting particles of a wide range of sizes (or fibers shorter than mm in length) to a chemical solution for periods of time ranging from about one minute to about 48 hours. The chemical solution was selected from a variety of oxidizing or intercalating solutions maintained at temperatures ranging from about room temperature to about 125° C. The polymeric carbon particles utilized can range in size from a fine powder small enough to pass through a 325 mesh screen to a size such that no dimension is greater than about one inch or 25.4 mm. The concentrations of the various compounds or materials employed, e.g. $H_2SO_4$, $HNO_3$, $KMnO_4$, $FeCL_3$, etc. ranged from about 0.1 normal to concentrated strengths. Ratios of $H_2SO_4$ to $HNO_3$ were also varied from about 9:1 to about 1:1 to prepare a range of acid mixtures. The chemical treatment may include interlayer chemical attack and/or intercalation, followed by a heating cycle. Exfoliation may also be achieved by using a foaming or blowing agent.

Interlayer chemical attack of polymeric carbon particles or short fibers is preferably achieved by subjecting the particles/fibers to oxidizing conditions. Various oxidizing agents and oxidizing mixtures may be employed to achieve a controlled interlayer chemical attack. For example, there may be utilized nitric acid, potassium chlorate, chromic acid, potassium permanganate, potassium chromate, potassium dichromate, perchloric acid and the like, or mixtures such as, for instance, concentrated nitric acid and potassium chlorate, chromic acid and phosphoric acid, sulfuric acid and nitric acid, etc, or mixtures of a strong organic acid, e.g. trifluoroacetic acid and a strong oxidizing agent soluble in the organic acid used. A wide range of oxidizing agent concentrations can be utilized. Oxidizing agent solutions having concentrations ranging from 0.1 normal to concentrated strengths may be effectively employed to bring about interlayer attack. The acids or the like utilized with the oxidizing agents to form suitable oxidizing media or mixtures can also be employed in concentrations ranging from about 0.1 normal to concentrated strengths.

The treatment of polymeric carbon particles or fibers with oxidizing agents or oxidizing mixtures such as mentioned above is preferably carried out at a temperature between about room temperature and about 125° C. and for periods of time sufficient to produce a high degree of interlayer attack. The treatment time will depend upon such factors as the temperature of the oxidizing medium, grade or type of polymeric carbon treated, particle/fiber size, amount of expansion desired and strength of the oxidizing medium.

The opening up or splitting apart of graphene layers can also be achieved by chemically treating polymeric carbon particles/fibers with an intercalating solution or medium, hereafter referred to as intercalant, so as to insert or intercalate a suitable additive between the carbon hexagon networks and thus form an addition or intercalation compound of carbon. For example, the additive can be a halogen such as bromine or a metal halide such as ferric chloride, aluminum chloride, or the like. A halogen, particularly bromine, may be intercalated by contacting the polymeric carbon particles with bromine vapors or with a solution of bromine in sulfuric acid or with bromine dissolved in a suitable organic solvent. Metal halides can be intercalated by contacting the polymeric carbon particles with a suitable metal halide solution. For example, ferric chloride can be intercalated by contacting polymeric carbon particles/fibers with a suitable aqueous solution of ferric chloride or with a mixture comprising ferric chloride and sulfuric acid. Temperature, times, and concentrations of reactants similar to those mentioned earlier for oxidation treatments can also be employed for the above intercalation processes.

Upon completion of the treatment directed to promoting interlayer attack, the thoroughly wetted or soggy polymeric carbon particles can be subjected to conditions for bringing about the expansion thereof. Preferably, however, the treated polymeric carbon particles are rinsed with an aqueous solution. The rinsing or washing of the treated particles/fibers with aqueous solution may serve several functions. For instance, the rinsing or leaching removes harmful materials, e.g. acid, from the particles so that it can be safely handled. Moreover, it may decompose or remove intercalated material. Furthermore, it can also serve as the source of the blowing or expanding agent, which is to be incorporated between layers. For example, it can serve as the source of water if water is to be utilized as the foaming, blowing or expanding agent.

The c-axis direction expansion is brought about by activating a material such as, for example, a suitable foaming or blowing agent which has been incorporated between layers of parallel graphene planes, the incorporation taking place either during the interlayer attack treatment or thereafter. The incorporated foaming or blowing agent upon activation such as by chemical interaction or by heat generates a fluid pressure, which is effective to cause c-axis direction expansion of the polymeric carbon particles. Preferably, a foaming or blowing agent is utilized which when activated forms an expanding gas or vapor which exerts sufficient pressure to cause expansion.

A wide variety of well-known foaming and blowing agents can be employed. For example, there can be utilized expanding agents such as water, volatile liquids, e.g., liquid nitrogen and the like which change their physical state during the expansion operation. When an expanding agent of the above type is employed, the expansion of the treated polymeric carbon particles is preferably achieved by subjecting the treated particles to a temperature sufficient to produce a gas pressure which is effective to bring about an almost instantaneous and maximum expansion of the particles. For instance, when the expanding agent is water, the particles having water incorporated in the structure are preferably rapidly heated or subjected to a temperature above 100° C. so as to induce a substantially instantaneous and full expansion of the particles. If such particles to be expanded are slowly heated to a temperature above 100° C., substantial water will be lost by vaporization from the structure resulting in a drying of the structure so that little expansion will be achieved. Preferably, the substantially complete and full expansion of the particles is accomplished within a time of from about a fraction of a second to about 10 seconds.

In addition to physical expanding methods such as described above, the expanding gas can be generated in situ, that is, between layers of carbon networks by the interaction of suitable chemical compounds or by the use of a suitable heat sensitive additive or chemical blowing agent.

As indicated previously, the polymeric carbon particles are so treated with a suitable oxidizing medium and unrestrictedly expanded that there is preferably produced expanded carbon masses having expansion ratios of at least 20 to 1 or higher. In other words, the expanded polymeric carbon particles have a thickness or c-axis direction dimension in the graphite crystallite at least 20 times of that of the un-expanded crystallite. The expanded carbon particles are unitary, laminar structure having a vermiform appearance. The vermiform masses are lightweight, anisotropic graphite-based materials.

The intercalation treatment is further described in what follows: Graphite is a crystalline form of carbon comprising hexagonally arranged atoms bonded in flat layered planes, commonly referred to as basal planes or graphene planes, with van der Waal's bonds between the planes. By treating particles of graphite, such as natural graphite flake, with an intercalant of e.g., a solution of sulfuric and nitric acid, the crystal structure of the graphite reacts to form a compound of graphite and the intercalant. The treated particles of graphite are hereafter referred to as intercalated graphite flake. Upon exposure to elevated temperatures the particles of intercalated graphite expand in dimension in an accordion-like fashion in the c-axis direction, i.e. in the direction perpendicular to the basal planes of the graphite. In a similar fashion, the presently heat-treated polymeric carbon, with or without pulverization, can be subjected to intercalation and high-temperature expansion treatment to obtain a polymeric carbon containing expanded graphene planes. The polymeric carbon is typically intercalated by dispersing the polymeric carbon particles or short fibers in a solution containing an oxidizing agent, such as a mixture of nitric and sulfuric acid. After the particles or fibers are intercalated excess solution is drained from the particles or fibers. The quantity of intercalation solution retained on the particles or fibers after draining is typically between 20 and 50 parts of solution by weight per 100 parts by weight of carbon (pph). In some cases, it reaches about 100 pph.

The intercalant of the present invention contains oxidizing intercalating agents known in the art of intercalated graphites. As indicated earlier, examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment of the invention, the intercalant is a solution of sulfuric acid, or sulfuric acid and phosphoric acid, and an oxidizing agent, i.e. nitric acid, perchloric acid, chromic acid, potassium permanganate, iodic or periodic acids, or the like, and preferably also includes an expansion aid as described below. The intercalant may contain metal halides such as ferric chloride, and ferric chloride mixed with sulfuric acid, or a halogen, such as bromine as a solution of bromine and sulfuric acid or bromine in an organic solvent.

The polymeric carbon particles or fibers treated with intercalant are contacted e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include the following: hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, propylene glycol monooleate, glycerol monostearate, glycerol monooleate, dimethyl oxylate, diethyl oxylate, methyl formate, ethyl formate and ascorbic acid. Depending upon the chemicals used in the exfoliation treatment, the edge of a graphene plane may contain some non-carbon atoms such as hydrogen, oxygen, nitrogen, sulphur, and combinations thereof.

Mechanical Attrition: The exfoliated particles or short fiber segments were then submitted to a mechanical attrition treatment to further separate graphene planes and reduce the sizes of particles or fibers to be nanometer-scaled. Attrition can be achieved by pulverization, grinding, milling, etc., but the most effective method of attrition is ball-milling. High-energy planetary ball mills were found to be particularly effective in producing nano-scaled graphene plates. Since, ball milling is considered to be a mass production process, the presently invented process is capable of producing large quantities of NGP materials cost-effectively. This is in sharp contrast to the production and purification processes of carbon nano-tubes, which are slow and expensive.

The nano-scaled graphene plate (NGP) material produced by the presently invented process can be readily incorporated in a matrix material to obtain an NGP-reinforced composite. The matrix material can be selected from a polymer (both thermoset and thermoplastic), organic, ceramic, glass, carbon, metal, or a combination thereof. The NGP-reinforced composites exhibit desirable mechanical and physical properties. In some cases (e.g., polymer matrix), either the strength or the failure strain was improved, with a concomitant increase in electrical and thermal conductivities. In other cases (e.g., ceramic matrix), the fracture toughness was improved over the corresponding un-reinforced matrix material. Typically, an NGP proportion of approximately 15 volume percent was sufficient to produce significantly improved properties. In many cases, an addition of NGPs in the amount of 1%–5% by volume was adequate.

EXAMPLE 1

One hundred grams of polymeric carbon, prepared by oxidation of PAN fibers at 250° C. and partial carbonization of the oxidized PAN at 500° C., were treated in a mixture of sulfuric and nitric acids at concentrations to yield the desired intercalation compound. The product was water washed and dried to approximately 1% by weight water. The dried fibers were introduced into a furnace at 1,250° C. to effect extremely rapid and high expansions of nano-scaled graphite crystallites. The exfoliated carbon sample, chopped into a short fiber form (<1 mm length), was then ball-milled in a high-energy plenary ball mill machine for 24 hours to produce nano-scaled particles.

EXAMPLE 2

Same as in Example 1, but the carbonization temperature was 1,000° C.

EXAMPLE 3

A phenol formaldehyde resin was heat treated in an inert atmosphere at a HTT in the range of 350–900° C. to obtain polymeric carbon, which was ground to mm-sized particles and then subjected to solution treatments to obtain exfoliated polymeric carbons. Samples containing exfoliated graphite crystallites were then ball-milled to become nanometer-sized powder.

EXAMPLE 4

A coal tar pitch sample was heat treated in an inert atmosphere at a HTT in the range of 350–900° C. to obtain polymeric carbon, which was further heat-treated at 2,500° C. and ground to mm-sized particles and then subjected to solution treatments to obtain exfoliated polymeric carbons. Specifically, 25 grams of the polymeric carbon particles were intercalated with twenty-five grams of intercalant consisting of 86 parts by weight of 93% sulfuric acid and 14 parts by weight of 67% nitric acid. The particles were then placed in a 90° C. oven for 20 minutes. The intercalated particles were then washed with water. After each washing the particles were filtered by vacuum through a Teflon screen. After the final wash the particles were dried for 1 hour in a 115° C. oven. The dried particles were then rapidly heated to approximately 1000° C. to further promote expansion. Samples containing exfoliated graphite crystallites were then ball-milled to become nanometer-sized powder.

EXAMPLE 5

A petroleum pitch sample was heat treated in an inert atmosphere at a HTT of 350° C. and extruded into a polymeric carbon fiber, which was further heat-treated at 2,500° C. and ground to mm-sized particles and then subjected to solution treatments to obtain exfoliated polymeric carbons. Specifically, 25 grams of the polymeric carbon particles were intercalated with twenty-five grams of intercalant consisting of 86 parts by weight of 93% sulfuric acid and 14 parts by weight of 67% nitric acid. After mixing for three minutes, 1.0 grams of decanol were blended into the particles. The particles were then placed in a 90° C. oven for 20 minutes. The intercalated particles were then washed with water. After each washing the particles were filtered by vacuum through a Teflon screen. After the final wash the particles were dried for 1 hour in a 115° C. oven. The dried particles were then rapidly heated to approximately 1,000° C. to further promote expansion. Samples containing exfoliated graphite crystallites were then ball-milled to become nanometer-sized powder.

EXAMPLE 6

The nanometer-sized powder obtained in EXAMPLE 5 was mixed with epoxy resin (Epon 828 and Z curing agent at a 4:1 ratio) to obtain a nano-scaled graphene plate (NGP) reinforced epoxy composite. A 35% increase in three-point-bending strength over the un-reinforced epoxy was observed with a composite containing only a 5% by volume of NGPs.

EXAMPLE 7

The nanometer-sized powder obtained in EXAMPLE 4 was mixed with polymethylmethacrylate (PMMA) to obtain an NGP-reinforced PMMA composite. An increase in tensile failure strain from approximately 5% for the un-reinforced PMMA to approximately 18% for an NGP (5%)-PMMA composite.

What is claimed is:

1. A nano-scaled graphene plate material comprising at least a nanometer-scaled plate with said plate comprising a sheet of graphite plane or a multiplicity of sheets of graphite plane; said graphite plane comprising a two-dimensional hexagonal lattice of carbon atoms and said plate having a length and a width parallel to said graphite plane and a thickness orthogonal to said graphite plane characterized in that the length, width, and thickness values are all smaller than 10 nanometers.

2. A composite material containing a matrix material and a predetermined proportion of nano-scaled graphene plate material as a reinforcement material, said nano-scaled graphene plate material comprising at least a nanometer-scaled plate with said plate comprising a sheet of graphite plane or a multiplicity of sheets of graphite plane; said graphite plane comprising a two-dimensional hexagonal lattice of carbon atoms and said plate having a length and a width parallel to said graphite plane and a thickness orthogonal to said graphite plane characterized in that the length, width, and thickness values are all 100 nanometers or smaller.

3. The composite material as set forth in claim 2, wherein said nano-scaled graphene plate material is at a proportion of no more than 15% by volume.

4. The composite material as set forth in claim 3, wherein said nano-scaled graphene plate material is at a proportion of no more than 5% by volume.

5. The composite material as set forth in claim 2, wherein said matrix material is selected from the group consisting of a polymer, a metal, a ceramic, a carbon, a glass, an organic material, or a combination thereof.

* * * * *